US008000187B2

(12) United States Patent
Takeda (10) Patent No.: US 8,000,187 B2
(45) Date of Patent: Aug. 16, 2011

(54) OPTICAL DISC DEVICE

(75) Inventor: Futoshi Takeda, Osaka (JP)

(73) Assignee: Funai Electric Co., Ltd., Osaka (JP)

( * ) Notice: Subject to any disclaimer, the term of this patent is extended or adjusted under 35 U.S.C. 154(b) by 0 days.

(21) Appl. No.: 12/795,136

(22) Filed: Jun. 7, 2010

(65) Prior Publication Data
US 2010/0315912 A1 Dec. 16, 2010

(30) Foreign Application Priority Data
Jun. 11, 2009 (JP) .................................. 2009-139719

(51) Int. Cl.
*G11B 7/00* (2006.01)
(52) U.S. Cl. ................................. 369/44.32; 369/112.23
(58) Field of Classification Search ............... 369/44.32, 369/112.23
See application file for complete search history.

(56) References Cited

U.S. PATENT DOCUMENTS
2008/0181088 A1* 7/2008 Okamoto .................. 369/112.24
2009/0122664 A1* 5/2009 Ichihara ..................... 369/44.32

FOREIGN PATENT DOCUMENTS
JP 2006-134498 5/2006
JP 2007-265578 10/2007
* cited by examiner

*Primary Examiner* — Latanya Bibbins
(74) *Attorney, Agent, or Firm* — Morgan, Lewis & Bockius LLP (57) ABSTRACT

An optical disc device includes: a first searching part which searches a condition where amplitude level of a TE signal is made maximum by changing either one of position of a movable lens and a focus balance value in a state where a focus servo control is performed based on a FE signal; an adjusting line setting part which sets an adjusting line that has an inclination α which is preliminarily stored in a memory portion and that passes the position of the movable lens and the focus balance value both of which are searched by the first searching part; and a second searching part which changes the position of the movable lens and the focus balance value to plural values on the adjusting line in a state where the focus servo control is performed consecutively to search a condition where the amplitude level of the tracking error signal is made maximum.

12 Claims, 5 Drawing Sheets

OPTICAL DISC DEVICE

This application is based on Japanese Patent Application No. 2009-139719 filed on Jun. 11, 2009, and the contents of which are hereby incorporated by reference.

BACKGROUND OF THE INVENTION

1. Field of the Invention

The present invention relates to an optical disc device which is used when reproduction of information recorded on an optical disc is performed, or recording of information on an optical disc is performed.

2. Description of Related Art

Recently, capacity of information that can be recorded in an optical disc has been greatly increased, and a blu-ray disc (hereinafter referred to as "BD") has become gradually a mainstream of the optical disc. In the optical disc device utilized for reproducing information recorded on the BD, or for recording information on the BD, in order to make size of a light spot formed on the optical disc small, wavelength ($\lambda$) of light from a light source is made short, and numerical aperture (NA) of an object lens is made large (for example, $\lambda$=405 nm, NA=0.85).

In general, it is well known that if thickness of a transparent cover layer which protects information recording layer of the optical disc varies, spherical aberration is caused, and amount of generation of the spherical aberration is roughly in proportion to biquadrate of the numerical aperture of the object lens and in inverse proportion to the wavelength. By this reason, the optical disc device corresponding to BD is easily affected by the spherical aberration in comparison with the optical disc device corresponding to CD or DVD, a spherical aberration correcting member to correct the spherical aberration is necessary to be provided.

From past, various kind of the spherical aberration correcting member has been proposed. Among them, there is one in that a collimator lens is controlled and driven, or one in that a beam expander is controlled and driven (See, for example, Patent Document 1 or 2). In those, the spherical aberration correction is performed by that a position along a direction of light axis of a movable lens such as the collimator lens or the like is adjusted by a lens moving mechanism, and a converging state or a diverging state of the light entering an objective lens is made change.

Among the optical disc devices that are provided with such kind of the spherical aberration correcting member, there are some devices that employ structure in that, for example, when reproduction or recording (hereinafter, there may be a case where it is merely referred to as "reproducing or the like") of the optical disc is begun, first, position of a movable lens is changed, then, servo control is begun to perform reproducing or the like based on positional information of the movable lens which is beforehand recorded in memory.

[Patent Document 1] JP-A-2006-134498
[Patent Document 2] JP-A-2007-265578

SUMMARY OF THE INVENTION

However, in order to correct the spherical aberration, only to move position of the movable lens to a predetermined position, there may be a case where amplitude level of a tracking error signal (hereinafter, referred to as "TE signal") is different from optimum value. In such a state where the amplitude level of TE signal is different from the optimum value, there may be a case where problem is caused, that a situation is generated, for example, in seeking operation, number of tracks cannot be correctly counted, and therefore, servo control cannot be achieved, and the like. Therefore, when position of the movable lens is changed to perform correction of the spherical aberration, it is preferable that position of the movable lens is decided in consideration of amplitude level of TE signal.

At this point, the "amplitude of TE signal" used here means amplitude of TE signal which is obtained when the optical disc is rotated in a state where focus servo control is "on" and tracking servo control is "off". Hereinafter, in this specification, in a case where the expression "amplitude of TE signal" is used without annotation, the expression is used always for this meaning.

Figure 7:
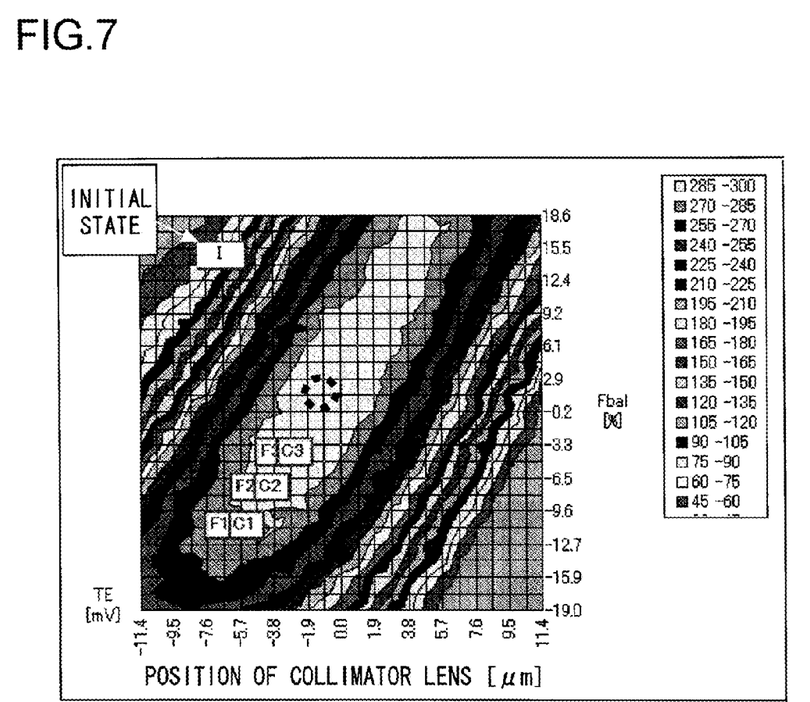
FIG. 7 is a graph to show one example of relation between position of a collimator lens and a focus balance value, and the amplitude level of TE signal.

FIG. 7 is a graph to show one example of relation between position of a collimator lens (one example of the movable lens) and focus balance (Fbal) value, and the amplitude level of TE signal. In detail, position of collimator lens is taken in horizontal axis, focus balance value is taken in vertical axis and points where the amplitude level of TE signals are equal, are connected to draw equal level lines.

At this point, the "focus balance" means balance of S character curve which shows characteristics of focus error signal (hereinafter, it is referred to as "FE signal") obtained by receiving reflected light from the optical disc. The focus balance value can be changed by, for example, gain adjustment or offset value adjustment of a light receiving amplifier.

From FIG. 7, it is understood that the amplitude level of TE signal can be kept in good level by setting properly both of position of the collimator lens and the focus balance value. That is, it is also understood that to adjust position of the collimator lens (movable lens) for correcting the spherical aberration in consideration of keeping the amplitude level of TE signal optimum, it is necessary to adjust the focus balance value at the same time.

In FIG. 7, the equal level line which is formed by connecting points where the amplitude level of TE signal are equal, forms roughly an elliptic shape and the ellipse is shown with angles against the vertical axis and the horizontal axis. In this kind of situation when position of the collimator lens and the focus balance value are decided in order that the amplitude level of TE signal is made maximum (optimum), it is conceivable to adopt a method as described below.

In FIG. 7, the "initial state" merely shows the amplitude level of TE signal at a time point that the focus servo control is begun by merely adjusting position of the collimator lens in accordance with a condition stored beforehand in a memory. That is, this "initial state" is a state before position of the collimator lens and the focus balance value are adjusted in order that the amplitude level of TE signal is made optimum. In this time point, the amplitude level of TE signal is different from the maximum value (shown in FIG. 7 with a circle of dotted line). In this respect, the reason why generation of such difference is caused by, for example, fluctuation in production of the devices or the optical discs.

Therefore, it is necessary to adjust position of the collimator lens and the focus balance value, and adjustment is performed with changing position of the collimator lens and the focus balance value in turn. In this case, whether which adjustment is performed first, can be selected freely. However, in the below explanation, an example is given where the focus balance value is adjusted first.

At first, the focus balance value is changed to plural values without moving position of the collimator lens in the "initial state", then, the focus balance value (F1) with that the amplitude level of TE signal is made maximum, is searched. Next, position of the collimator lens is changed to plural values with fixing the focus balance value as the focus balance value (F1)

that was searched above, then, position of the collimator lens (C1) with that the amplitude level of TE signal is made maximum, is searched. Next, the focus balance value is changed again to plural values with fixing position of the collimator lens as the position of the collimator lens (C1) that was searched above, then, the focus balance value (F2) with that the amplitude level of TE signal is made maximum, is searched.

By repeating above described steps, that is, in FIG. 7, it is moved as F2→C2→F3→C3 . . . and the like, the focus balance value and position of the collimator lens are searched with those the amplitude level of TE signal is made maximum (optimum). A time point where the condition where the amplitude level of TE signal is made maximum has been found, is that the focus balance value and position of the collimator lens are not found which give better amplitude level of TE signal.

At this point, by position of the collimator lens and the focus balance value that are obtained by means of above described manner and that make the amplitude level of TE signal optimum, reproduction characteristics of the optical disc device can also be good one with preventing influence due to the spherical aberration.

However, in case where position of collimator lens (movable lens) and the focus balance value are adjusted by means of above described manner, in some cases, too much time is required to find out the condition by that the amplitude level of TE signal is made optimum value. It causes a problem.

Thus, it is an object of the present invention to provide an optical disc device by that time length can be reduced to adjust position of the movable lens for spherical aberration correction and the focus balance value in order that the amplitude level of TE signal is made optimum.

To attain the above described object, the optical disc device according to the present invention includes: an optical pickup which irradiates an optical disc with light and detects returned light from the optical disc by a photo detector; a movable lens for correcting spherical aberration which is arranged in an optical system of the optical pickup; a focus error signal generating part which generates a focus error signal by processing an electric signal output from the photo detector; a tracking error signal generating part which generates a tracking error signal by processing an electric signal output from the photo detector; a movable lens position adjusting part which performs control to adjust position of the movable lens; a focus balance adjusting part which performs control to adjust a focus balance value that is a balance value of an S character curve of the focus error signal; an amplitude detecting part which detects amplitude level of the tracking error signal; a memory portion which stores an inclination $\alpha$ obtained in advance from a graph with either one of the position of the movable lens and focus balance value as a horizontal axis and the other as a vertical axis, the graph showing lines of equal amplitude levels of the tracking error signal, the inclination $\alpha$ being an inclination of a major axis of the equal level lines, each of which is an approximate ellipse, with regard to the horizontal axis; a first searching part which searches a condition where the amplitude level of the tracking error signal is made maximum by changing either one of the position of the movable lens and the focus balance value in a state where a focus servo control is performed based on the focus error signal; an adjusting line setting part which sets an adjusting line that has the inclination $\alpha$ and passes the position of the movable lens and the focus balance value both of which are searched by the first searching part; and a second searching part which changes the position of the movable lens and the focus balance value to plural values on the adjusting line in a state where the focus servo control is performed consecutively to search a condition where the amplitude level of the tracking error signal is made maximum.

According to this structure, structure is employed in which an adjusting line is set utilizing an information (inclination $\alpha$) which is in advance stored in the memory portion, and a condition is searched where the amplitude level of TE signal is made maximum (optimum) while position of the movable lens and the focus balance value are changed at a same time based on the adjusting line. As a result, this structure can find out the optimum condition in shorter time than conventional structure in which a condition is searched where the amplitude level of TE signal is made maximum (optimum) while position of the movable lens and the focus balance value are changed in turn.

In the optical disc device having the above described structure, it is preferable that the second searching part changes the position of the movable lens and the focus balance value to plural values on the adjusting line to search two conditions under which the amplitude level of the tracking error signal becomes not more than a predetermined ratio of the amplitude level of the tracking error signal under the position of the movable lens and the focus balance value both of which are searched by the first searching part, and obtains a condition that is a median of the two conditions as a condition under which the amplitude level of the tracking error signal is made maximum. Because variation of the amplitude level of TE signal is small in relation to change of position of the movable lens and the focus balance value near the point where the amplitude level of TE signal is made maximum, it is difficult to find out the condition under which the amplitude level of TE signal is made maximum (optimum). In this respect, according to the present structure, the condition can be easily (in short time) found out where the amplitude level of TE signal is made maximum (optimum) by properly setting the predetermined ratio.

At this point, in the above described structure, it is preferable that the predetermined ratio is about ninety percent. This is because it is considered that it becomes harder to find exactly out two conditions when the predetermined ratio is too large and it takes too much time to find out the two conditions when the predetermined ratio is too small. That is, when the predetermined ratio is made be about ninety percent, it is easy to find out the two conditions exactly, and further, it does not take too long time to find out the two conditions.

In the optical disc device having the above described structure, it is preferable that the position of the movable lens is stored in the memory portion in association with information about a recording layer on which reproducing or recording is performed, and the focus servo control is begun after the position of the movable lens is adjusted to the position stored in the memory portion. According to the present structure, because position of the movable lens and the focus balance value where the amplitude level of TE signal is made maximum, are found out after position of the movable lens is roughly adjusted based on information that is preliminarily stored in the memory portion, adjustment of position of the movable lens and the focus balance value can be performed in short time.

In the optical disc device having above described structure, it is preferable that the movable lens is a collimator lens. By this arrangement, structure of the optical disc device can be made simple.

According to the present invention, an optical disc device is provided by that time length can be reduced to adjust position of the movable lens for spherical aberration correction and the focus balance value in order that the amplitude level of TE signal is made optimum.

DETAILED DESCRIPTION OF THE PREFERRED EMBODIMENTS

Hereinafter, embodiment of an optical disc device according to the present invention will be explained in detail with reference to drawings. In below, the explanation is given by way of example in which the optical disc device is a device that can reproduce information recorded on BD, or can record information on BD as one example. However, this is not intended that applicable scope according to the present invention is limited to an optical disc device which is compatible only to BD. Further, the explanation is given, as an example, about a case where BD is a double layer disc that has two information recording layers of L1 layer and L2 layer.

Figure 1:
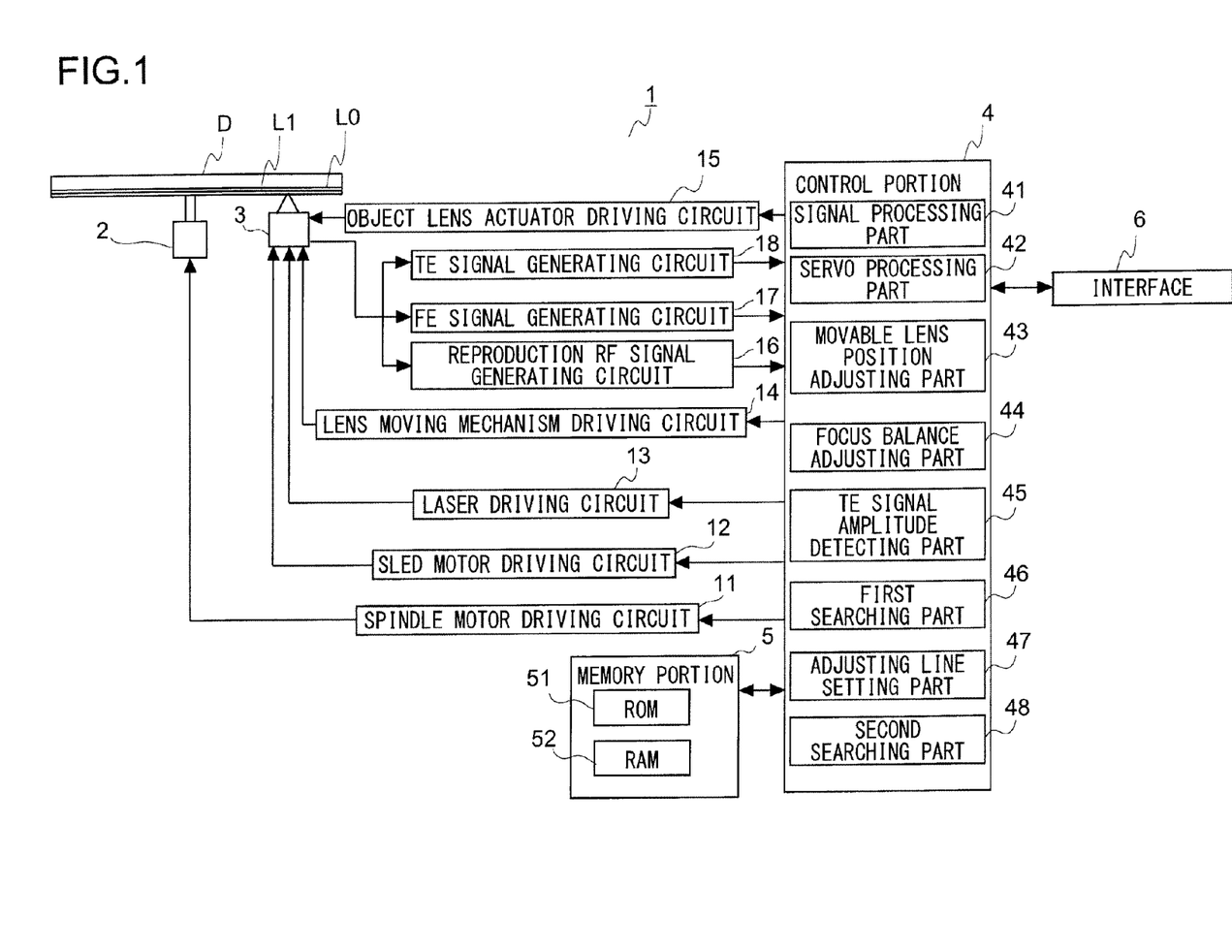
FIG. 1 is a block diagram to show structure of an optical disc device according to the present embodiment.

FIG. 1 is a block diagram to show structure of an optical disc device according to the present embodiment. As shown in FIG. 1, the optical disc device 1 according to the present embodiment includes a spindle motor 2. The spindle motor 2 is connected to a turntable (not shown) that holds detachably the optical disc D. By this structure, the optical disc D held by the turn table can be made rotate by rotating the spindle motor 2. In the spindle motor 2, rotation frequency thereof is controlled through a spindle motor driving circuit 11 that is operated by a command from a control portion 4.

Further, the optical disc device 1 according to the present embodiment includes an optical pickup 3 which irradiates the optical disc D with light and detects a returned light reflected by the optical disc D by a photo detector (detail will be described later). The optical pickup 3 is configured to be movable in a radial direction (corresponding to left and right direction in FIG. 1) of the optical disc D by driving of a sled motor that is not shown by means of relation of rack and pinion. The sled motor is controlled its driving through a sled motor driving circuit 12 which is operated by a command from the control portion 4.

Figure 2:
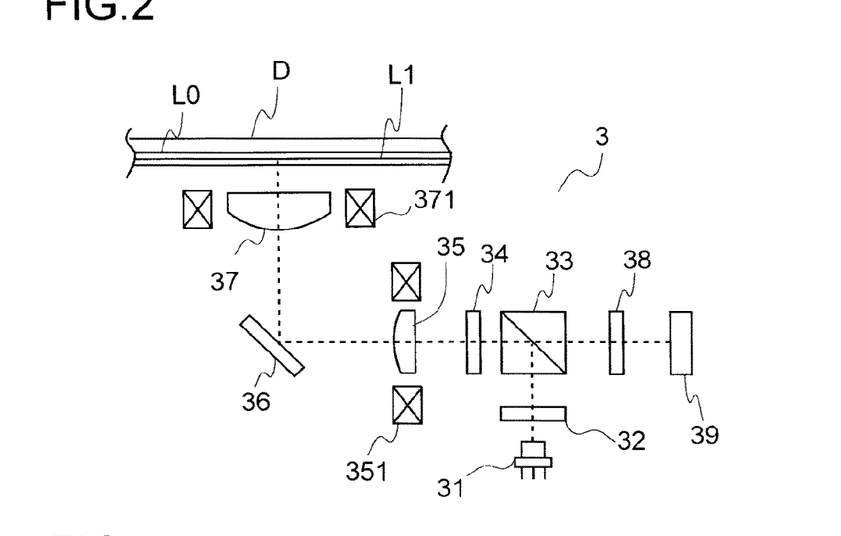
FIG. 2 is a schematic diagram to show optical structure of an optical pickup provided in the optical disc device according to the present embodiment.

FIG. 2 is a schematic diagram to show optical structure of an optical pickup provided in the optical disc device according to the present embodiment. A light source 31 of the optical pickup 3 is composed by a semiconductor laser which emits a laser light for BD (for example, laser light having wavelength of 405 nm band). This light source 31 is controlled its operation through a laser driving circuit 13 (See, FIG. 1) which is operated by a command from the control portion 4.

The laser light output from the light source 31 is diffracted by a grating 32 to divide into a main light and two sub lights. The reason to divide laser light into the main light and the sub lights as above described, is to make possible that a tracking error signal (TE signal) that is necessary to perform tracking servo control is obtained by utilizing a Differential Push-Pull (DPP) method. About structure to obtain TE signal by utilizing the DPP method, explanation will be given later.

The laser light output from the laser source 31 is reflected by a polarization beam splitter 33 and the returned light reflected by the optical disc D passes through the polarization beam splitter 33. The laser light from the polarization beam splitter 33 is converted into a circular polarization light and the returned light reflected by the optical disc D is converted into a linear polarization light by a quarter wavelength plate 34.

A collimator lens 35 is a lens having a function to convert input laser light into parallel ray. In the optical disc device 1 according to the present embodiment, the collimator lens 35 is configured to be movable in a light axis direction (a left and right direction in FIG. 2) by a lens moving mechanism 351. The reason to configure the collimator lens 35 movable in the light axis direction is that it makes possible to alter a state of laser light output from the collimator lens 35 to be a divergent ray or a convergent ray. Further, the reason to make the state of light alterable is that it makes possible to perform correction of the spherical aberration.

At this point, any kind of structure can be employed for the lens moving mechanism 351 as far as in that the collimator lens 35 can be made move in the light axis direction, it is not limited particularly to specific one. For example, a movable holder which holds the collimator lens 35 may be moved along guide shafts that extend in the light axis direction by a motor and a lead screw, though the structure is not shown because it is well known. The lens moving mechanism 351 is controlled its driving through a lens moving mechanism driving circuit 14 (See, FIG. 1) operated by a command from the control portion 4.

A raising mirror 36 is a mirror to reflect input light, and reflects a laser light from the collimator lens 35 to output to an object lens 37. The object lens 37 is an object lens designed for BD with high NA (for example, NA=0.85), and focuses the laser light input from the raising mirror 36 on an information recording layer (L0 or L1) of the optical disc D. This object lens 37 is arranged on an object lens actuator 371, and it is configured to be movable in a focusing direction (direction coming closer to or going away from the optical disc D, and it is a vertical direction in FIG. 2) and a tracking direction (direction parallel to a radial direction of the optical disc D, and it is a horizontal direction in FIG. 1).

As above described, by means that the object lens 37 is movable in the focusing direction or the tracking direction, it is made operable a focus servo control such that a focus point of the object lens 37 is matched always on the information recording layer (L0 or L1) that is a target position, and a tracking servo control such that a light spot that is focused by the object lens 37 is made always trace with a track formed on the optical disc D. The object lens actuator 371 is controlled its driving through an object lens actuator driving circuit 15 (See, FIG. 1) that is driven by a command from the control portion 4.

At this point, in the object lens actuator 371 according to the present embodiment, structure is employed in that a lens holder holding the object lens 37 is suspended to swing by wires (rod like elastic supporting member) and the object lens 37 is moved integrated with the lens holder in the focusing direction and the tracking direction utilizing electromagnetic action. However, above described structure of the object lens actuator 371 is not intended to limit to the present invention. Because structure of the object lens actuator of this kind is well known, detailed explanation is omitted here.

A sensor lens 38 gives astigmatism to the returned light reflected by the optical disc D. For this sensor lens 38, any means will do as far as it gives the astigmatism, and for example, cylindrical lens, hologram element and the like are used. The reason to give the astigmatism by the sensor lens 38 is, to make it possible to obtain FE signal by the astigmatism method. Structure to obtain FE signal by the astigmatism method will be described later.

Figure 3:
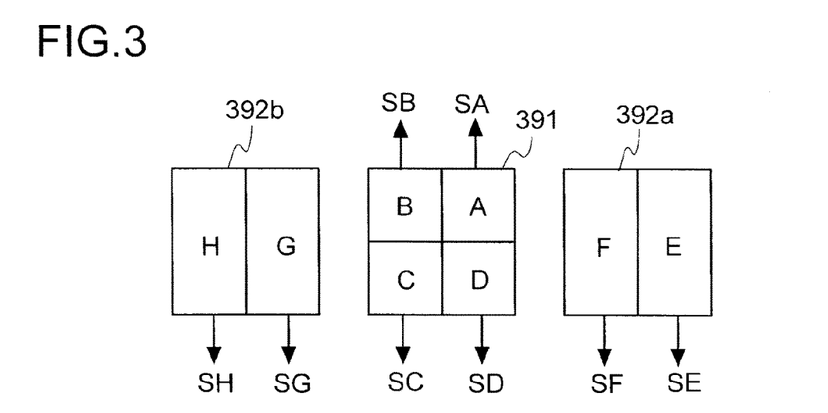
FIG. 3 is a schematic plan view to show structure of a light receiving part of a photo detector provided in the optical disc device according to the present embodiment.

A photo detector 39 converts the received light signal into an electrical signal to output. By processing the signal output from the photo detector 39, as described below, the reproduced signal, and the servo signals such as FE signal, and TE signal are obtained. FIG. 3 is a schematic plan view to show structure of a light receiving part of a photo detector provided in the optical disc device according to the present embodiment. As shown in FIG. 3, the photo detector 39 is provided with a main light receiving part 391 and two sub light receiving part 392a and 392b which are arranged so that the main light receiving part 391 is put between them.

Each of the main light receiving part 391 and the sub light receiving parts 392a and 392b is formed substantially in a rectangular shape. Further, the three light receiving parts 391, 392a and 392b are arranged in a state where substantially they make a single line. The main light receiving part 391 is divided in four photo receiving areas A-D each of which has the same dimension. Still further, the sub light receiving part 392a is divided in two photo receiving areas E, F each of which has the same dimension, and the sub light receiving part 392b is divided in two photo receiving areas G, H each of which has the same dimension.

Now return to FIG. 1, a reproduction RF signal generating circuit 16 generates reproduction RF signal based on a signal output from the photo detector 39 to output the obtained RF signal to the control portion 4. The reproduction RF signal is obtained by a calculating process shown by a formula (1) below. At this point, SA, SB, SC and SD in the formula (1) show signals that are output from each of four regions A-D of the main light receiving part 391 respectively as shown in FIG. 3. In this respect, this is the same in below description.

$$\text{Reproduction } RF \text{ signal} = SA + SB + SC + SD \quad (1)$$

An FE signal generating circuit 17 generates FE signal based on a signal output from the photo detector 39, and outputs the obtained FE signal to the control portion 4. As above described, in the optical disc device 1 according to the present embodiment, structure is employed in that FE signal is obtained by the astigmatism method, and FE signal is obtained in an arithmetic process shown by formula (2) below.

$$FE \text{ signal} = (SA + SC) - (SB + SD) \quad (2)$$

A TE signal generating circuit 18 generates TE signal based on a signal output from the photo detector 39, and outputs the obtained TE signal to the control portion 4. As above described, in the optical disc device 1 according to the present embodiment, structure is employed in that TE signal is obtained by the DPP method, and TE signal is obtained in an arithmetic process shown by formula (3) below.

$$TE \text{ signal} = MPP - k \times SPP \quad (3)$$

where
  MPP (push-pull signal of the main light)=(SA+SD)−(SB+SC)
  SPP (push-pull signal of the sub light)=(SE−SF)+(SG−SH)
  k: a constant decided to compensate and calibrate light intensity difference between the main light and two sub lights.

Further, SE, SF, SG, SH in the formula (3) show signals output from each of the region E-H of the light receiving parts 392a and 392b for the sub light as shown in FIG. 3.

The control portion 4 includes a micro processor, and it is configured to execute control process appropriately in response to operations executed by each portion composing the optical disc device 1 and to achieve arithmetic process required for the control. A memory portion 5 which is arranged to make data interchange with the control portion 4 possible, is provided with ROM 51 (Read Only Memory) and RAM 52 (Random Access Memory). In ROM 51 various kinds of parameters and operating programs are stored that are required by the control portion 4 to execute the various kinds of processes. RAM 52 is used as a working area for the control portion 4 and it is configured as storing area for various kind of necessary information.

A signal processing part 41 provided in the control portion 4 outputs reproduced data through an interface 6 by decoding the reproduced RF signal. Further, when data is input from outside through the interface 6, the signal processing part 41 achieves a process to encode input data. In this respect, based on the data that receives the encoding process, each portion is controlled in order to execute information writing (recording) to the optical disc D utilizing the optical pickup 3.

A servo processing part 42 provided in the control portion 4 generates control signal to perform the focus servo control based on FE signal and generates control signal to perform the tracking servo control based on TE signal. Further, the servo processing part 42 generates control signal to drive the sled motor.

In the optical disc device 1 according to the present embodiment, structure is employed in that position of the movable lens is adjusted such that amplitude level of TE signal is made optimum when position of the collimator lens 35 is moved to perform correction of the spherical aberration. As above described, in order to make the amplitude level of TE signal optimum (maximum), adjustment of position of the collimator lens 35 and focus balance value is required. In the optical disc device 1 according to the present embodiment, ingenuity is made such that time which is required for the adjustment of position of the collimator lens 35 and focus balance value becomes short. To perform the adjustment for position of the collimator lens 35 and the focus balance value in short time, a movable lens position adjusting part 43, a focus balance adjusting part 44, a TE signal amplitude detecting part 45, a first searching part 46, an adjusting line setting part 47 and a second searching part 48 are provided in the control portion 4 to contribute.

The movable lens position adjusting part 43 controls the lens position driving mechanism 351 through the lens moving mechanism driving circuit 14 to perform control operation to adjust position of the collimator lens 35.

The focus balance adjusting part 44 performs a control operation to change and adjust appropriately the focus balance value (Fbal). In this respect, as described above, the focus balance value is balance of S character curve which shows characteristics of FE signal obtained by receiving reflected light from the optical disc D, and it is obtained by formula (4) below.

$$Fbal(\%) = 100 \times (FEP-FEM)/(FEP+FEM) \quad (4)$$

Figure 4:
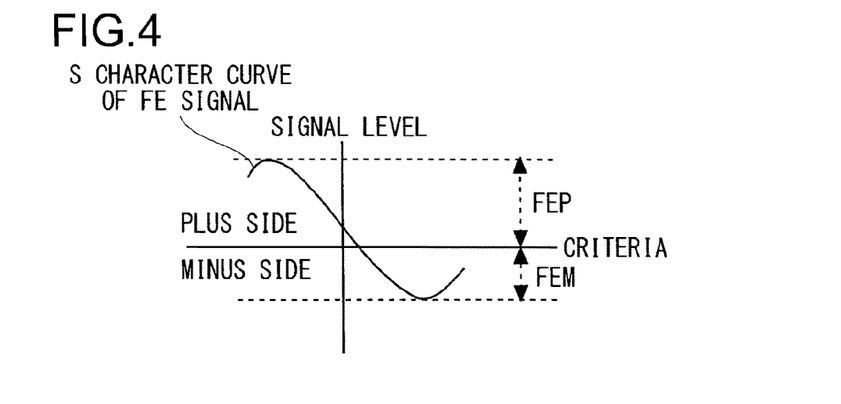
FIG. 4 is a schematic diagram to explain a focus balance value.

At this point, as shown in FIG. 4, FEP is a plus side level of FE signal, and FEM is a minus side level of FE signal. In this respect, FIG. 4 is a schematic diagram to explain the focus balance value.

The focus balance adjusting part 44 makes focus balance value change by offset adjustment of criteria of signal level. When the focus balance value is changed by the focus balance adjusting part 44 while the focus servo control is performed, focus position of the object lens 39 is changed.

The TE signal amplitude detecting part 45 performs a process to detect the amplitude level of TE signal input from TE signal generating circuit 18.

The first searching part 46 searches a condition where the amplitude level of TE signal is made maximum by changing only either one of position of the collimator lens 35 and the focus balance value in a state where the focus servo control is performed. Structure is employed in the device 1 according to the present embodiment in that the first searching part 46 makes the focus balance value change in cooperation with the focus balance adjusting part 44.

The adjusting line setting part 47 performs process to set an adjusting line to make it possible searching of the condition where the amplitude level of TE signal is made maximum while both the position of the collimator lens and the focus balance value are changed at the same time. Detail of the adjusting line will be described later.

The second searching part 48 changes the position of the collimator lens 35 and the focus balance value based on the adjusting line that is set by the adjusting line setting part 47, in a state where the focus servo control is consecutively performed, to search the condition where the amplitude level of TE signal is made maximum (optimum). In this respect, the adjustment of position of the collimator lens 35 is performed in cooperation with the movable lens position adjusting part 43, and the adjustment of the focus balance value is performed in cooperation with the focus balance adjusting part 44.

Figure 5:
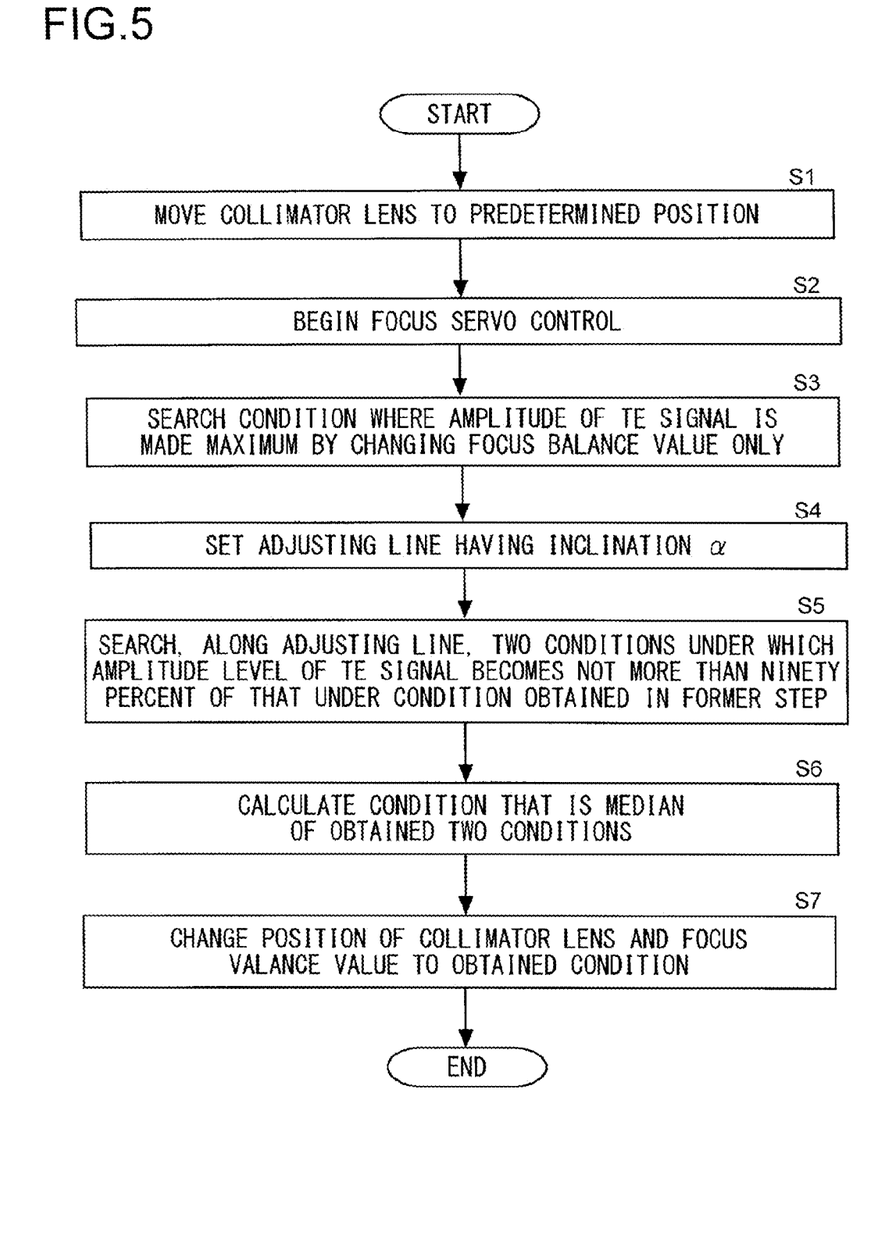
FIG. 5 is a flowchart to show process for deciding position of the collimator lens and the focus balance value in order that the amplitude level of TE signal is made optimum in the optical disc device according to the present embodiment.
Figure 6:
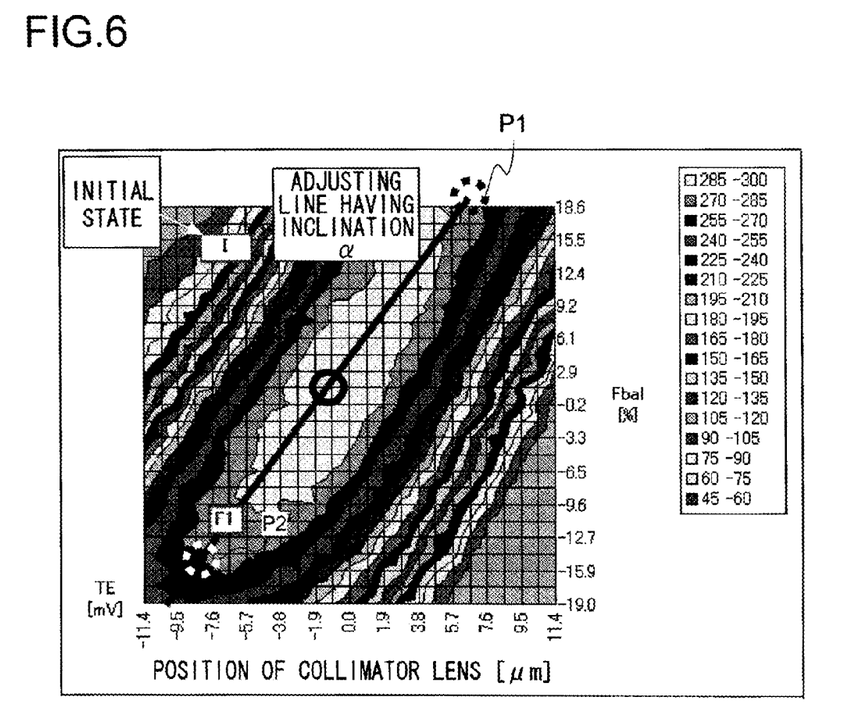
FIG. 6 is an explanatory diagram to help understanding of a deciding method for position of the collimator lens and the focus balance value in the optical disc device according to the present embodiment.

Next, detail of the process to decide the position of the collimator lens 35 and the focus balance value such that the amplitude level of TE signal is made maximum, will be explained with reference to FIG. 5 and FIG. 6. FIG. 5 is a flowchart to show process for deciding position of the collimator lens and the focus balance value such that the amplitude level of TE signal is made optimum in the optical disc device according to the present embodiment. FIG. 6 is an explanatory diagram to help understanding of a deciding method for position of the collimator lens and the focus balance value in the optical disc device according to the present embodiment. In this respect, the graph in FIG. 6 to show relation among the position of the collimator lens, the focus balance value and the amplitude level of TE signal is made in the same manner as the above described FIG. 7.

In the information recording layer L0 and the information recording layer L1 of the optical disc D, thickness of the transparent cover layer to protect the information recording layer is different. As a result, it is necessary to change position of the collimator lens 35 at which the spherical aberration can be prevented appropriately depending on a case where which information recording layer between L0 and L1 is reproduced or the like. The movable lens position adjusting part 43 performs process to move position of the collimator lens 35 in conformity with information in advance stored in the ROM 51 of the memory portion 5 as for the position of the collimator lens 35 to correct the spherical aberration at a time point where which information recording layer is reproduced or the like is decided, or at a time point where a command is output to change information recording layer to be reproduced or the like (step S1).

In this respect, the optimum value of the collimator lens 35 that is preliminarily decided by experiment is stored in ROM 51 in association with the recording layer to be reproduced or recorded. However, by mere movement of the position of the collimator lens 35 in accordance with the condition stored in ROM 5, there may be a possibility that the amplitude level of TE signal is not made optimum value (maximum value). Therefore, operation is performed to decide position of the collimator lens 35 and the focus balance value in order to make the amplitude level of TE signal maximum after the movement of position of the collimator lens in step S1.

After the movement of position of the collimator lens 35 to the predetermined position, the first searching part 46 is adapted to perform the process that the optical disc D is rotated to start the focus servo control (step S2). The "initial state" in FIG. 6 shows the amplitude level of TE signal at this time point, and the amplitude level of TE signal is different from the optimum value which is shown by circle of solid line in FIG. 6. Therefore, it is in a state where adjustment of position of the collimator lens and the focus balance value is necessary.

When the focus servo control is begun, the first searching part 46 changes the focus balance value to plural values in cooperation with the focus balance adjusting part 44 and detects the amplitude level of TE signal at each of the changed focus balance values in cooperation with TE signal amplitude detecting part 45. Then, based on the detected amplitude level of TE signal, the first searching part 46 searches a focus balance value by which the amplitude level of TE signal is made maximum (step S3). At this point, position of the collimator lens 35 is retained at the initial state position while process of step S3 is performed. In this respect "F1" in FIG. 6 shows the condition (position of the collimator lens and the focus balance value) which is found out at a time point of step S3.

Next, inclination α of the adjusting line stored in advance in ROM 51 of the memory portion 5 is read out by the adjusting line setting part 47, an adjusting line is set that has this inclination α and passes the position of the collimator lens and the focus balance value searched in step 3 (step S4). The straight line shown in thick solid line in FIG. 6 is one example of the adjusting line obtained in step S4.

At this point, the inclination α is obtained in advance for each of optical disc devices, for example, through steps below described. That is, first, position of the collimator lens is took in horizontal axis and the focus balance value is took in vertical axis (of course horizon axis and vertical axis can be exchanged either), and points having the same amplitude level of TE signal are connected each other to obtain an equal level line that is a graph in FIG. 6. Then, inclination of a longer axis of the equal level line that is roughly an ellipse with regard to horizontal axis is sought as the inclination α. At this point, when the inclination α is sought, an approximate expression showing the ellipse may be obtained utilizing, for example, a least square method and the like, and inclination of the longer axis of the ellipse with regard to the horizon axis can be obtained if the approximate expression which expresses the ellipse is obtained.

As shown in FIG. 6, because the adjusting line decided in step S4 passes on (or near) a point at which the amplitude level of TE signal is made optimum (circle of black solid line in FIG. 6), by searching a point at which the amplitude level of TE signal is made maximum along the adjusting line, it can be said that position of the collimator lens and the focus balance value to be searched are obtained.

At this point, because space between the equal level lines becomes especially large near the point where the amplitude level of TE signal is made maximum on this adjusting line, it is difficult to find out the point at which the amplitude level of TE signal is made maximum. Therefore, as one example of ingenuity to easily find out the point at which the amplitude level TE signal is made maximum, it is configured to perform below described steps S5 and S6.

When the adjusting line is set in step S4, the second searching part 48 changes both the position of the collimator lens and the focus balance value to plural values along the adjusting line in cooperation with the movable lens position adjusting part 43 and the focus balance adjusting part 44. Then, the second searching part 48 evaluates the amplitude level of TE signal for each of the changed points in cooperation with TE signal amplitude detecting part 45, and searches two conditions where the amplitude level of TE signal becomes not more than a predetermined ratio (for example, about ninety percent) of the amplitude level of TE signal under the condition obtained in step S3 which corresponds to the amplitude level of the point shown as "F1" (step S5).

In detail, the two conditions are searched in a manner that both the position of the collimator lens and the focus balance value are changed to plural values on both the plus side from "F1" shown in FIG. 6 (side where position of the collimator lens and the focus balance value become larger) and the minus side (opposite to the plus side). The points P1 and P2 which are shown by dotted circles in FIG. 6 correspond to the searched two conditions. In this respect, in the present embodiment the above described predetermined ratio is ninety percent. This is because it is considered that it becomes harder to find exactly out two conditions when the predetermined ratio is too large and it takes time to find out the two conditions when the predetermined ratio is too small. Further, when the two conditions are finally decided, it is preferable to decide the conditions such that the amplitude levels of TE signal are almost the same between both the conditions.

After the two conditions are found out, the second searching part 48 calculates a condition that is a median of the two conditions as the desired condition at which the amplitude level of TE signal is made optimum (step S6). Then, position of the collimator lens and the focus balance value are adjusted so as to be the condition obtained in step S6 (step S7), and adjustment of position of the collimator lens and the focus balance value is completed.

As above described, in the optical disc device 1 according to the present embodiment, structure is employed in which the optimum condition is obtained while both of position of the collimator lens and the focus balance value are changed at a same time except the first step (searching by the first searching part) to obtain the position of the collimate lens and the focus balance value so as to make the amplitude level of TE signal optimum. Therefore, the optical disc device 1 according to the present embodiment can reduce the time length required to adjust position of the collimate lens and the focus balance value in order that the amplitude level of TE signal is made optimum.

At this point, the above described embodiment is mere an example, and it is no need to say that scope where the present invention is applied is not limited to structure shown in above embodiment.

For example, according to the present embodiment, structure is employed in which the movable lens utilized to correct the spherical aberration is a collimator lens. However, it is not intended to limit the present invention only to the structure, and the present invention can be applied to an optical disc device and the like in which, for example, the movable lens utilized to correct the spherical aberration is a part of plurality of lens that compose a beam expander.

Further, it is not intended to limit the optical disc device according to the present invention only to the optical disc device compatible to BD as above described, the present invention can be applied widely to the optical disc device having structure in which the spherical aberration correction is performed by adjusting position of the movable lens along the light axis.

The present invention is applied to an optical disc device having structure in which the spherical aberration correction is performed by adjusting position of a movable lens along the light axis, and it is especially preferable for an optical disc device compatible to BD.

What is claimed is:

1. An optical disc device comprising:
   an optical pickup which irradiates an optical disc with light and detects returned light from the optical disc by a photo detector;
   a movable lens for correcting spherical aberration which is arranged in an optical system of the optical pickup;
   a focus error signal generating part which generates a focus error signal by processing an electric signal output from the photo detector;
   a tracking error signal generating part which generates a tracking error signal by processing an electric signal output from the photo detector;
   a movable lens position adjusting part which performs control to adjust position of the movable lens;
   a focus balance adjusting part which performs control to adjust a focus balance value that is a balance value of an S character curve of the focus error signal;
   an amplitude detecting part which detects amplitude level of the tracking error signal;
   a memory portion which stores an inclination $\alpha$ obtained in advance from a graph with either one of the position of the movable lens and focus balance value as a horizontal axis and the other as a vertical axis, the graph showing lines of equal amplitude levels of the tracking error signal, the inclination $\alpha$ being an inclination of a major axis of the equal level lines, each of which is an approximate ellipse, with regard to the horizontal axis;
   a first searching part which searches a condition where the amplitude level of the tracking error signal is made maximum by changing either one of the position of the movable lens and the focus balance value in a state where a focus servo control is performed based on the focus error signal;
   an adjusting line setting part which sets an adjusting line that has the inclination $\alpha$ and passes the position of the movable lens and the focus balance value both of which are searched by the first searching part; and
   a second searching part which changes the position of the movable lens and the focus balance value to plural values on the adjusting line in a state where the focus servo control is performed consecutively to search a condition where the amplitude level of the tracking error signal is made maximum.

2. The optical disc device according to claim 1, wherein the second searching part changes the position of the movable lens and the focus balance value to plural values on the adjusting line to search two conditions under which the amplitude level of the tracking error signal becomes not more than a predetermined ratio of the amplitude level of the tracking error signal under the position of the movable lens and the focus balance value both of which are searched by the first searching part, and obtains a condition that is a median of the two conditions as a condition under which the amplitude level of the tracking error signal is made maximum.

3. The optical disc device according to claim 1, wherein the position of the movable lens is stored in the memory portion in association with information about a recording layer on which reproducing or recording is performed, and the focus servo control is begun after the position of the movable lens is adjusted to the position stored in the memory portion.

4. The optical disc device according to claim 1, wherein the movable lens is a collimator lens.

5. The optical disc device according to claim 2, wherein the predetermined ratio is about ninety percent.

6. The optical disc device according to claim 2, wherein the position of the movable lens is stored in the memory portion in association with information about a recording layer on which reproducing or recording is performed, and the focus servo control is begun after the position of the movable lens is adjusted to the position stored in the memory portion.

7. The optical disc device according to claim 2, wherein the movable lens is a collimator lens.

8. The optical disc device according to claim 3, wherein the movable lens is a collimator lens.

9. The optical disc device according to claim 5, wherein the position of the movable lens is stored in the memory portion in association with information about a recording layer on which reproducing or recording is performed, and the focus servo control is begun after the position of the movable lens is adjusted to the position stored in the memory portion.

10. The optical disc device according to claim 5, wherein the movable lens is a collimator lens.

11. The optical disc device according to claim 6, wherein the movable lens is a collimator lens.

12. The optical disc device according to claim 9, wherein the movable lens is a collimator lens.

* * * * *